United States Patent
Sadamura et al.

(10) Patent No.: US 10,036,420 B2
(45) Date of Patent: Jul. 31, 2018

(54) THRUST BEARING AND MANUFACTURING METHOD FOR SAME

(71) Applicant: NSK LTD., Tokyo (JP)

(72) Inventors: Masaki Sadamura, Takasaki (JP); Yuki Shimpo, Takasaki (JP); Hiromichi Takemura, Takasaki (JP); Yutaka Kondou, Takasaki (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/329,650

(22) PCT Filed: Jul. 28, 2015

(86) PCT No.: PCT/JP2015/071356
§ 371 (c)(1),
(2) Date: Jan. 27, 2017

(87) PCT Pub. No.: WO2016/017629
PCT Pub. Date: Feb. 4, 2016

(65) Prior Publication Data
US 2017/0211621 A1 Jul. 27, 2017

(30) Foreign Application Priority Data

Jul. 28, 2014 (JP) ................... 2014-153074
Jul. 22, 2015 (JP) ................... 2015-145144

(51) Int. Cl.
*F16C 19/30* (2006.01)
*F16C 33/46* (2006.01)
(Continued)

(52) U.S. Cl.
CPC ........ *F16C 19/305* (2013.01); *F16C 33/4605* (2013.01); *F16C 19/30* (2013.01);
(Continued)

(58) Field of Classification Search
CPC ............................ F16C 19/305; F16C 33/406
See application file for complete search history.

(56) References Cited

U.S. PATENT DOCUMENTS 3,805,972 A   4/1974   Pitner
6,116,787 A   9/2000   Muntnich et al.
(Continued)

FOREIGN PATENT DOCUMENTS

CN   107002753 A   8/2017
CN   206592430 U   10/2017
(Continued)

OTHER PUBLICATIONS

Machine Translation of JP 2011-085239.*
(Continued)

*Primary Examiner* — Thomas R Hannon
(74) *Attorney, Agent, or Firm* — Sughrue Mion, PLLC

(57) ABSTRACT

A thrust bearing includes: a retainer that is provided with a plurality of pockets; a plurality of rollers that are arranged so as to freely rotate inside the plurality of pockets; and at least one first race that has an annular-shaped first race section in which the plurality of rollers move. The first race is provided with a hook curl section that is formed by bending the first race section from an outer-diameter-side periphery thereof toward the inner-diameter side obliquely in the radial direction, and an outer peripheral surface of the retainer has a conical surface that is formed so as to be substantially parallel to an inner peripheral surface of the hook curl section. The inner peripheral surface of the hook curl section holds the retainer without separating therefrom by contacting the outer peripheral surface of the retainer in a sliding manner.

16 Claims, 10 Drawing Sheets

(51) Int. Cl.
   *F16C 33/54* (2006.01)
   *F16C 33/58* (2006.01)
(52) U.S. Cl.
   CPC ............ *F16C 33/46* (2013.01); *F16C 33/543* (2013.01); *F16C 33/547* (2013.01); *F16C 33/58* (2013.01)

(56) References Cited

U.S. PATENT DOCUMENTS

| | | | | |
|---|---|---|---|---|
| 8,814,440 | B2* | 8/2014 | Fukami | F16C 19/30 384/623 |
| 2014/0016893 | A1 | 1/2014 | Nishikawa | |
| 2014/0072256 | A1 | 3/2014 | Yamada | |
| 2017/0307006 | A1 | 10/2017 | Yamamoto et al. | |
| 2017/0307007 | A1 | 10/2017 | Yamamoto et al. | |
| 2017/0307017 | A1 | 10/2017 | Yamamoto et al. | |
| 2017/0307018 | A1 | 10/2017 | Yamamoto et al. | |
| 2017/0314620 | A1 | 11/2017 | Yamamoto et al. | |
| 2017/0321751 | A1 | 11/2017 | Yamamoto et al. | |

FOREIGN PATENT DOCUMENTS

| | | |
|---|---|---|
| DE | 19535085 A1 | 3/1997 |
| JP | 48-39844 A | 6/1973 |
| JP | 51-20346 A | 2/1976 |
| JP | 51-20346 Y1 | 5/1976 |
| JP | 5-94527 U | 12/1993 |
| JP | 2007-187207 A | 7/2007 |
| JP | 2008-281016 A | 11/2008 |
| JP | 2011-85239 A | 4/2011 |
| JP | 2012-229799 A | 11/2012 |
| JP | 2012-255526 A | 12/2012 |
| WO | 2012/141247 A1 | 10/2012 |

OTHER PUBLICATIONS

Written Opinion dated Oct. 20, 2015 issued by International Searching Authority in counterpart International Application No. PCT/JP2015/071356 (PCT/ISA/237).
International Search Report dated Oct. 20, 2015 issued by International Searching Authority in counterpart International Application No. PCT/JP2015/071356 (PCT/ISA/210).
English translation of Written Opinion dated Oct. 20, 2015, issued by the International Searching Authority in counterpart International Patent Application No. PCT/JP2015/071356 (PCT/ISA/237).
Communication dated Jul. 14, 2017, issued by the European Patent Office in counterpart European Patent Application No. 15827135.3.
Communication issued by the Korean Intellectual Property Office dated Feb. 8, 2018 in counterpart Korean Patent Application No. 10-2017-7002524.
Communication dated Apr. 8, 2018, from the State Intellectual Property Office of People's Republic of China in counterpart Application No. 201580041430.0.

* cited by examiner

THRUST BEARING AND MANUFACTURING METHOD FOR SAME

TECHNICAL FIELD

The present invention relates to a thrust bearing and a method of manufacturing the same, and more particularly, to a thrust bearing configured to bear thrust load, which is to be applied to a rotary shaft of a transmission, a compressor or the like of an automobile, and a method of manufacturing the same.

RELATED ART

In the related art, a bearding device of a gear mechanism having a radial roller bearing and a thrust roller bearing has been known in which a guide body configured to prevent interference between a retainer of the thrust roller bearing and a retainer of the radial roller bearing is provided at an inner-diameter-side part of a bearing ring member of the thrust roller bearing (for example, refer to Patent Document 1). The guide body has an outer-diameter-side cylindrical part protruding axially from an inner diameter edge of the bearing ring member in a cylinder shape and having an outer peripheral surface as a first guide surface and an annular-shaped part bent annularly from an end edge of the outer-diameter-side cylindrical part toward a center-side and having one side surface as a second guide surface, and is configured to guide the retainer of the thrust roller bearing by the first guide surface and to guide the retainer of the radial roller hearing by the second guide surface.

Also, a thrust roller bearing where an outer peripheral edge portion of a retainer made of a synthetic resin is formed as a convex curved surface over an entire circumference and the retainer is thus prevented from edge-contacting an inner peripheral surface of a folded vertical wall of a race is known (for example, refer to Patent Document 2).

Further, in a thrust bearing 100 of the related art, as shown in FIG. 12, a retainer 102 configured to hold a rolling element 101 is accommodated in a circular ring-shaped lip part 104 of a race 103, and an engaging part 105 provided at an end portion of the lip part 104 by a staking tab is engaged to an end portion of the retainer 102, so that the retainer is mounted so as not to separate from the race 103. Also, according to the thrust bearing 100, a peripheral edge portion of an outer peripheral surface 102a of the retainer 102 is provided with chamfered portions 102b, 102c so as to prevent interference between the retainer 102 and the engaging part 105 of the race 103 and between the retainer and curved portion 104b of the lip part 104.

CITATION LIST

Patent Documents

Patent Document 1: Japanese Patent Application Publication No. 2011-085239A
Patent Document 2: Japanese Patent Application Publication No. 2007-187207A

SUMMARY OF THE INVENTION

Problems to be Solved

According to the thrust bearing 100 shown in FIG. 12, when radial load or radial displacement is applied, the outer peripheral surface 102a of the retainer 102 is contacted to an inner peripheral surface 104a of the lip part 104 in a sliding manner, so that the retainer 102 is guided. However, since an area of the outer peripheral surface 102a of the retainer 102 is reduced clue to the chamfered portions 102b, 102c, when the thrust bearing 100 is applied with the radial load or the radial displacement, a surface pressure of a sliding contact part with the inner peripheral surface 104a of the lip part 104 increases and wear occurs, so that the lifespan of the thrust bearing 100 may be influenced.

Particularly, in recent years, since a thrust bearing to be used in an automatic transmission or the like of an automobile is used as a replacement of a sliding bearing, it is strongly used to make the thrust bearing thin. If a thickness of the retainer 102 is reduced so as to make the thrust bearing 100 of FIG. 12 thin, the area of the outer peripheral surface 102a of the retainer 102 configured to contact the inner peripheral surface 104a of the lip part 104 in a sliding manner is further reduced, so that the surface pressure of the sliding contact part with the inner peripheral surface 104a of the lip part 104 further increases.

Also, when the thrust hearing 100 is made thin, it is more difficult to axially form the lip part 104 and the engaging part 105 at the race 103 in a continuous manner.

The present invention has been made in view of the above situations, and an object of the present invention is to provide an integrated thrust bearing capable of being made thin while suppressing wear of a sliding contact part between a retainer and a race. Also, another object of the present invention is to provide a method of manufacturing a thrust bearing capable of improving a mounting ability of a retainer while securely holding the retainer.

Means for Solving the Problems

The objects of the present invention are accomplished by following configurations.

(1) A thrust bearing including a retainer having a plurality of pockets arranged radially, a plurality of rolling elements arranged so as to freely rotate inside the plurality of pockets, and at least one race having an annular-shaped race part in which the plurality of rolling elements moves, wherein the race has a hook curl part formed by bending the race part from an outer-diameter-side periphery of the race part toward an inner-diameter-side obliquely in a radial direction, an outer peripheral surface of the retainer has a conical surface formed to be substantially parallel to an inner peripheral surface of the hook curl part, and the inner peripheral surface of the book curl part is configured to hold the retainer without separating therefrom by contacting the outer peripheral surface of the retainer in a sliding manner.

(2) A thrust bearing including a retainer having a plurality of pockets arranged radially, a plurality of rolling elements arranged so as to freely rotate inside the plurality of pockets, and at least one race having an annular-shaped race part in which the plurality of rolling elements moves, wherein the race has a hook curl part formed by bending the race part from an inner-diameter-side periphery of the race part toward an outer-diameter-side obliquely in a radial direction, an inner peripheral surface of the retainer has a conical surface formed to be substantially parallel to an outer peripheral surface of the hook curl part, and the outer peripheral surface of the hook curl part is configured to hold the retainer without separating therefrom by contacting the inner peripheral surface of the retainer in a sliding manner.

(3) In the thrust bearing of (1) or (2), the thrust bearing is a thrust roller bearing of which rolling elements are rollers.

(4) In the thrust bearing of (1) or (2), the thrust bearing is a thrust ball bearing of which rolling elements are balls.

(5) A method of manufacturing a thrust bearing including a retainer having a plurality of pockets arranged radially, a plurality of rolling elements arranged so as to freely rotate inside the plurality of pockets and at least one race having an annular-shaped race part in which the plurality of rolling elements moves, wherein the race has a hook curl part formed by bending the race part from an outer-diameter-side periphery of the race part toward an inner-diameter-side obliquely in a radial direction, an outer peripheral surface of the retainer has a conical surface formed to be substantially parallel to an inner peripheral surface of the hook curl part, and the inner peripheral surface of the hook curl part is configured to hold the retainer without separating therefrom by contacting the outer peripheral surface of the retainer in a sliding manner, the method including:

a process of preparing the retainer having the plurality of rolling elements arranged in the plurality of pockets and an annular-shaped race material, a process of arranging the retainer and the race material so that the plurality of rolling elements is in contact with a race part of the race material, and a process of forming the hook curl part by bending an outer-diameter-side part of the race material toward an inner-diameter-side obliquely in a radial direction so as to be substantially parallel to the conical surface of the retainer.

(6) A method of manufacturing a thrust bearing including a retainer having a plurality of pockets arranged radially, a plurality of rolling elements arranged so as to freely rotate inside the plurality of pockets and at least one race having an annular-shaped race part in which the plurality of rolling elements moves, wherein the race has a hook curl part formed by bending the race part from an inner-diameter-side periphery of the race part toward an outer-diameter-side obliquely in a radial direction, an inner peripheral surface of the retainer has a conical surface formed to be substantially parallel to an outer peripheral surface of the hook curl part, and the outer peripheral surface of the hook curl part is configured to hold the retainer without separating therefrom by contacting the inner peripheral surface of the retainer in a sliding manlier, the method including:

a process of preparing the retainer having the plurality of rolling elements arranged in the plurality of pockets and an annular-shaped race material, a process of arranging the retainer and the race material so that the plurality of rolling elements is in contact with a race part of the race material, and a process of forming the hook curl part by bending an inner-diameter-side part of the race material toward an outer-diameter-side obliquely in a radial direction so as to be substantially parallel to the conical surface of the retainer.

(7) A method of manufacturing a thrust hearing including a retainer having a plurality of pockets arranged radially, a plurality of rolling elements arranged so as to freely rotate inside the plurality of pockets and at least one race having an annular-shaped race part in which the plurality of rolling elements moves, wherein the race has a plurality of hook curl parts, which are formed by bending the race part from an outer-diameter-side periphery of the race part toward an inner-diameter-side obliquely in a radial direction and are provided by a plurality of notched portions, an outer peripheral surface of the retainer has a plurality of protrusions protruding radially outward of which conical surfaces are formed to be substantially parallel to inner peripheral surfaces of the plurality of hook curl parts, and the inner peripheral surfaces of the hook curl parts are configured to hold the retainer without separating therefrom by contacting the outer peripheral surface of the retainer in a sliding manner, the method including:

a process of preparing the retainer having the plurality of rolling elements arranged in the plurality of pockets and the race having the plurality of hook curl parts and the plurality of notched portions formed thereto, a process of incorporating the retainer to the race with phases of the plurality of protrusions and the plurality of notched portions being matched and arranging the retainer and the race so that the plurality of rolling elements is in contact with the race part of the race, and a process of rotating the retainer relative to the race so that the conical surfaces of the retainer face radially the plurality of hook curl parts of the race.

(8) A method of manufacturing a thrust bearing including a retainer having a plurality of pockets arranged radially, a plurality of rolling elements arranged so as to freely rotate inside the plurality of pockets and at least one race having an annular-shaped race part in which the plurality of rolling elements moves, wherein the race has a plurality of hook curl parts, which are formed by bending the race part from an inner-diameter-side periphery of the race part toward an outer-diameter-side obliquely in a radial direction and are provided by a plurality of notched portions, an inner peripheral surface of the retainer has a plurality of protrusions protruding radially inward of which conical surfaces are formed to be substantially parallel to outer peripheral surfaces of the plurality of hook curl parts, and the outer peripheral surfaces of the hook curl parts are configured to hold the retainer without separating therefrom by contacting the inner peripheral surface of the retainer in a sliding manner, the method including:

a process of preparing the retainer having the plurality of rolling elements arranged in the plurality of pockets and the race having the plurality of hook curl parts and the plurality of notched portions formed thereto, a process of incorporating the retainer to the race with phases of the plurality of protrusions and the plurality of notched portions being matched and arranging the retainer and the race so that the plurality of rolling elements is in contact with the race part of the race, and a process of rotating the retainer relative to the race so that the conical surfaces of the retainer face radially the plurality of hook curl parts of the race.

Effects of the Invention

According to the thrust bearing of the present invention, the race has the hook curl part formed by bending the race part from the outer-diameter-side periphery of the race part toward the inner-diameter-side obliquely in the radial direction, and the outer peripheral surface of the retainer has the conical surface formed to be substantially parallel to the inner peripheral surface of the hook curl part. Since the inner peripheral surface of the hook curl part is configured to hold the retainer without separating therefrom by contacting the outer peripheral surface of the retainer in a sliding manner, the hook curl part has both a function of holding the retainer and a function of guiding the retainer when radial load or radial displacement is applied to the thrust bearing. Also, even when the thrust bearing is made thin, it is possible to secure an area of a sliding contact part between the inner peripheral surface of the hook curl part and the outer peripheral surface of the retainer, so that it is possible to reduce a surface pressure of the sliding contact part and to thus suppress the wear. Thereby, it is possible to manufacture the non-separable and thin thrust bearing to be guided at the outer periphery-side of the retainer.

Also, according to the thrust bearing of the present invention, the race has the hook curl part formed by bending the race part from the inner-diameter-side periphery of the race part toward the outer-diameter-side obliquely in the radial direction, and the inner peripheral surface of the retainer has the conical surface formed to be substantially parallel to the outer peripheral surface of the hook curl part. Since the outer peripheral surface of the hook curl part is configured to hold the retainer without separating therefrom by contacting the inner peripheral surface of the retainer in a sliding manner, the hook curl part has both a function of holding the retainer and a function of guiding the retainer when the radial load or radial displacement is applied to the thrust bearing. Also, even when the thrust bearing is made thin, it is possible to secure an area of a sliding contact part between the outer peripheral surface of the hook curl part and the inner peripheral surface of the retainer, so that it is possible to reduce a surface pressure of the sliding contact part and to thus suppress the wear. Thereby, it is possible to manufacture the non-separable and thin thrust bearing to be guided at the inner periphery-side of the retainer.

Also, according to the manufacturing method of the thrust bearing of the present invention, in a case where the retainer is guided at the outer-diameter-side of the race, the hook curl part is formed by bending the outer-diameter-side part of the race material toward the inner-diameter-side obliquely in the radial direction with the retainer being arranged at the annular-shaped race material. Therefore, it is possible to improve a mounting ability of the retainer while securely holding the retainer by the hook curl part.

Also, in a case where the retainer is guided at the inner-diameter-side of the race, the hook curl part is formed by bending the inner-diameter-side part of the race material toward the outer-diameter-side obliquely in the radial direction with the retainer being arranged at the annular-shaped race material. Therefore, it is possible to improve the mounting ability of the retainer while securely holding the retainer by the hook curl part.

Also, according to another manufacturing method of the thrust bearing of the present invention, in any case where the retainer is guide at the outer-diameter-side or inner-diameter-side of the race, the retainer and the race are arranged with the phases of the plurality of protrusions of the retainer and the plurality of notched portions of the race being matched, and the retainer is then rotated relative to the race so that the conical surfaces of the retainer face radially the plurality of hook curl parts of the race. Thereby, it is possible to improve the mounting ability of the retainer while securely holding the retainer by the plurality of hook curl parts.

DETAILED DESCRIPTION OF EMBODIMENTS

Hereinafter, respective embodiments of the thrust bearing of the present invention will be described in detail with reference to the drawings.

First Embodiment

First, a thrust bearing in accordance with a first embodiment of the present invention is described with reference to FIG. 1.

Figure 1:
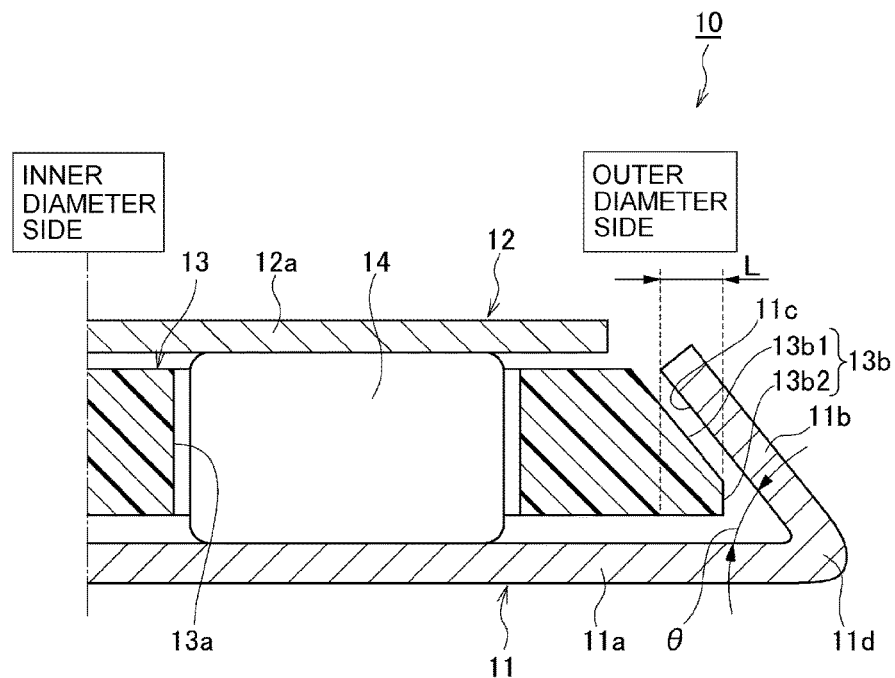
FIG. 1 is a sectional view of a thrust roller bearing in accordance with a first embodiment of the present invention.

As shown in FIG. 1, a thrust roller bearing 10 of the first embodiment has a first race 11, a second race 12, a retainer 13 arranged between the first race 11 and the second race 12, and a plurality of rollers 14, which are rolling elements arranged so as to freely rotate inside the plurality of pockets 13a of the retainer 13.

The first race 11 has a circular plate-shaped first race part 11a and an annular-shaped hook curl part 11b formed to have a circular frustum shape by bending the first race part 11a from an outer-diameter-side periphery 11d thereof toward an inner side acutely in a radial direction. Also, the second race 12 has a circular plate-shaped second race part 12a facing the first race part 11a in an axial direction.

The retainer 13 has a thin circular disc shape made of a synthetic resin. The plurality of rollers 14 is held in the plurality of pockets 13a which is radially arranged in the retainer 13 so as to freely rotate with an axis of rotation of the roller 14 extending in the radial direction. An outer peripheral surface 13h of the retainer 13 has a conical surface 13b1 inclined at the substantially same angle θ as an inclined angle θ of an inner peripheral surface 11c of the hook curl part 11b, and a cylindrical surface 13b2 adjacent to a large-diameter-side part of the conical surface 13b1 and provided to prevent interference with the outer-diameter-side periphery 11d. In the meantime, the present invention is not limited to the cylindrical surface 13b2 and a curved shape may also be adopted inasmuch as it can prevent the interference with the outer-diameter-side periphery 11d.

The retainer 13 is incorporated to an inner side of the hook curl part 11b of the first race 11, so that the inner peripheral surface 11c of the hook curl part 11b and the outer peripheral surface 13b of the retainer 13, i.e., the conical surface 13b1 are contacted in a sliding manner and the first race 11 and the retainer 13 are mounted without separating from each other. That is, a maximum diameter of the outer peripheral surface 13b of the retainer 13 is greater than a minimum diameter of the inner peripheral surface 11c of the hook curl part 11b, and the outer peripheral surface and the inner peripheral surface overlap with each other, as seen from an axial direction, so as to secure a sufficient contact surface pressure (for example, a contact over a half or greater of an area of the conical surface 13b1).

Accordingly, the plurality of rollers 14 held in the pockets 13a of the retainer 13 is arranged to freely rotate between the first race part 11a of the first race 11 and the second race part 12a of the second race 12, and bears thrust load that is to be applied to the thrust roller bearing 10.

Also, when radial load or radial displacement is applied to the thrust roller bearing 10, the inner peripheral surface 11c of the hook curl part 11b of the first race 11 and the outer peripheral surface 13b of the retainer 13 are contacted in a sliding manner. That is, the hook curl part 11b of the first race 11 has both a guide function of guiding the retainer 102, which is provided by the lip part 104 of the thrust roller bearing 100 of the related art, and a holding function of holding the retainer 102 without separating the same, which is provided by the engaging part 105. Therefore, it is possible to easily thin the thrust roller bearing 10 of the first embodiment by the hook curl part 11b, as compared to the thrust roller bearing 100 of the related art in which the lip part 104 and the engaging part 105 are arranged side by side in the axial direction (a thickness direction of the thrust roller bearing 100).

Further, even when the thickness of the thrust roller bearing 10 is reduced, it is possible to positively secure a contact area between the hook curl part 11b of the first race 11 and the outer peripheral surface 13b of the retainer 13. Thereby, a surface pressure of the sliding contact surface between the hook curl part 11b of the first race 11 and the outer peripheral surface 13b of the retainer 13 is reduced, so that the wear can be suppressed. Therefore, it is possible to use the thrust roller bearing even under environments where the radial load such as eccentricity or centrifugal force is applied to the thrust roller bearing 100 of the related art and the thin thrust roller bearing 100 is thus difficult to be used. Also, from a standpoint of securing a space, the thrust roller bearing 10 of the first embodiment can be used even at a part at which a slide bearing such as a washer has been used, so that it is possible to reduce a rotation resistance.

Further, since the first race 11 and the retainer 13 are integrally mounted without separating from each other, it is possible to easily mount the thrust roller bearing to a bearing part of a vehicle or the like, for example.

Figure 2:
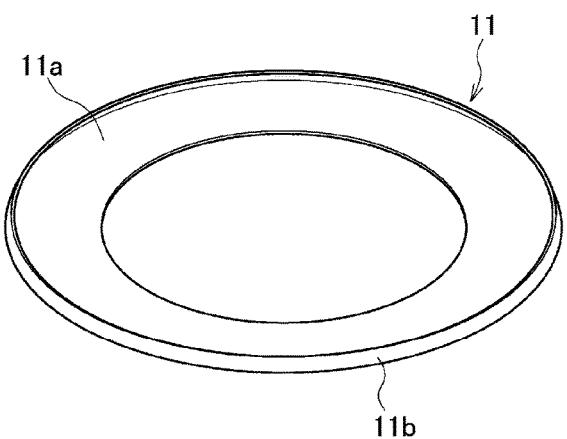
FIG. 2 is a perspective view of a race shown in FIG. 1.
Figure 3A:
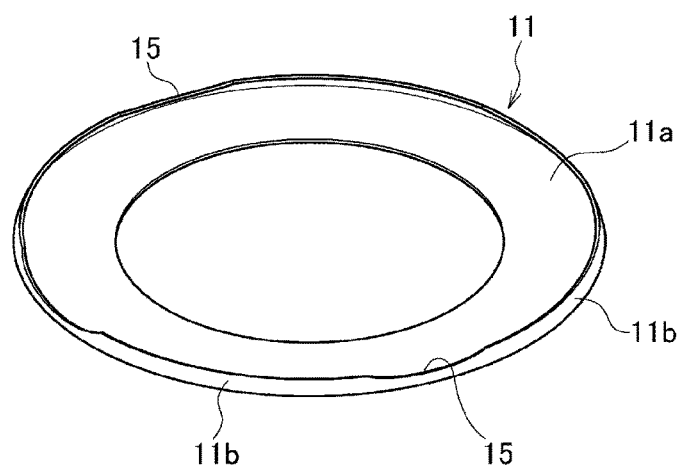
FIG. 3A is a perspective view of a race having circular arc-shaped notched portions in accordance with a modified embodiment.
Figure 3B:
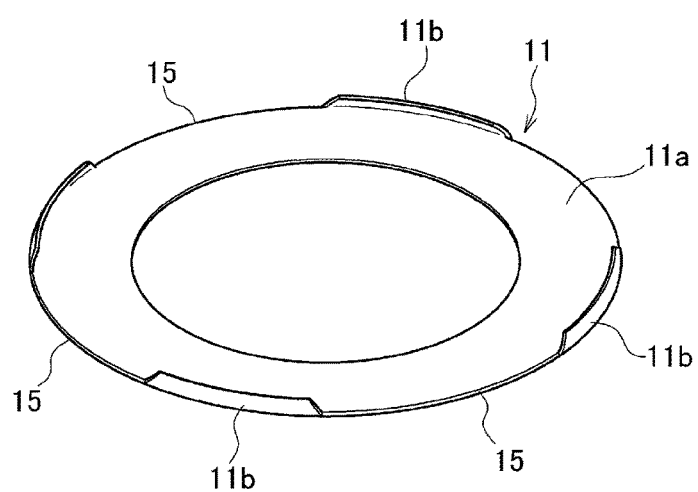
FIG. 3B is a perspective view of a race having trapezoidal notched portions in accordance with another modified embodiment.

In the meantime, the hook curl part 11b of the first race part 11a may be formed by bending the first race part from an entire periphery edge of an outer-diameter-side of the first race part 11a toward an inner side in a radial direction, as shown in FIG. 2, or may be formed with a plurality of notched portions 15 by notching circumferential portions of the annular-shaped hook curl part 11b into a circular arc shape (FIG. 3A) or a trapezoidal shape (FIG. 3B), as shown in FIG. 3. In the meantime, the number, sizes and intervals of the notched portions 15 can be arbitrarily set and are appropriately selected, considering oil permeability and the like.

As described above, according to the thrust roller bearing 10 of the first embodiment, the first race 11 has the hook curl part 11b formed by bending the first race part from the outer-diameter-side periphery of the first race part 11a toward the inner-diameter-side obliquely in the radial direction, and the outer peripheral surface 13b of the retainer 13 has the conical surface 13b1 formed to be substantially parallel to the inner peripheral surface 11c of the hook curl part 11b. The inner peripheral surface 11c of the hook curl part 11b is configured to hold the retainer 13 without separating therefrom by contacting the outer peripheral surface 13b of the retainer 13 in a sliding manner. Therefore, the hook curl part 11b has both a function of holding the retainer 13 and a function of guiding the retainer when the radial load or radial displacement is applied to the thrust roller bearing 10. Also, even when the thrust roller bearing 10 is made thin, it is possible to secure an area of the sliding contact part between the inner peripheral surface 11c of the hook curl part 11b and the outer peripheral surface 13b of the retainer 13, so that it is possible to reduce the surface pressure of the sliding contact part and to thus suppress the wear. Thereby, it is possible to manufacture the non-separable and thin thrust roller bearing 10 to be guided at the outer periphery-side of the retainer 13.

Second Embodiment

Subsequently, a thrust bearing in accordance with a second embodiment of the present invention is described with reference to FIG. 4. In the meantime, the same or equivalent elements as or to the first embodiment are denoted with the same reference numerals, and the descriptions thereof are omitted or simplified.

Figure 4:
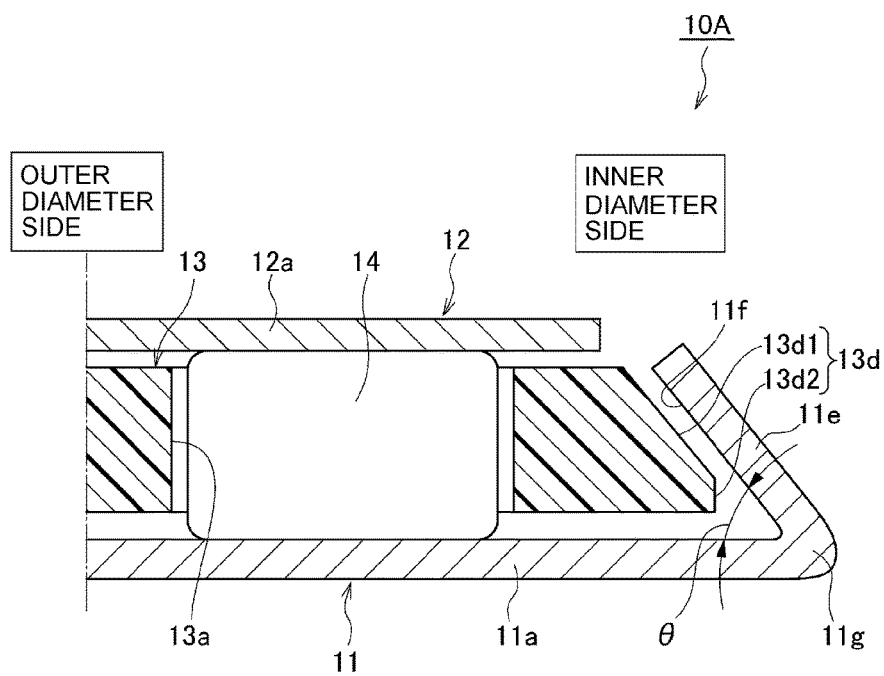
FIG. 4 is a sectional view of a thrust roller bearing in accordance with a second embodiment of the present invention.

As shown in FIG. 4, a thrust roller bearing 10A of the second embodiment has the first race 11, the second race 12, the retainer 13 arranged between the first race 11 and the second race 12, and the plurality of rollers 14, which are rolling elements arranged to freely rotate inside the plurality of pockets 13a of the retainer 13.

The first race 11 has the circular plate-shaped first race part 11a and an annular-shaped hook curl part 11e formed to have a circular frustum shape by bending the first race part 11a from an inner-diameter-side periphery 11g thereof toward an outer side acutely in a radial direction. Also, the second race 12 has the circular plate-shaped second race part 12a facing the first race part 11a in an axial direction.

The retainer 13 has a thin circular disc shape made of a synthetic resin. The plurality of rollers 14 is held in the plurality of pockets 13a which is radially arranged in the retainer 13 so as to freely rotate with an axis of rotation of the roller 14 extending in the radial direction. An inner peripheral surface 13d of the retainer 13 has a conical surface 13d1 inclined at the substantially same angle θ as an inclined angle θ of an outer peripheral surface 11f of the hook curl part 11e, and a cylindrical surface 13d2 adjacent to a small-diameter-side part of the conical surface 13d1 and provided to prevent interference with the inner-diameter-side periphery 11g. In the meantime, the present invention is not limited to the cylindrical surface 13d2 and a curved shape may also be adopted inasmuch as it can prevent the interference with the inner-diameter-side periphery 11g.

The retainer 13 is incorporated to an outer side of the hook curl part 11e of the first race 11, so that the outer peripheral surface 11f of the hook curl part 11e and the inner peripheral surface 13d of the retainer 13, i.e., the conical surface 13d1 are contacted in a sliding manner and the first race 11 and the retainer 13 are mounted without separating from each other. That is, a minimum diameter of the inner peripheral surface 13d of the retainer 13 is smaller than a maximum diameter of the outer peripheral surface 11f of the hook curl part 11e, and the inner peripheral surface and the outer peripheral surface overlap with each other, as seen from an axial direction, so as to secure a sufficient contact surface pressure (for example, a contact over a half or greater of an area of the conical surface 13d1).

When the radial load or radial displacement is applied to the thrust roller bearing 10A, the outer peripheral surface 11f of the hook curl part 11e of the first race 11 and the inner peripheral surface 13d of the retainer 13 are contacted in a sliding manner. For this reason, even when the thickness of the thrust roller bearing 10A is reduced, it is possible to positively secure a contact area between the hook curl part 11e of the first race 11 and the inner peripheral surface 13d of the retainer 13. Thereby, a surface pressure of the sliding contact surface between the hook curl part 11e of the first race 11 and the inner peripheral surface 13d of the retainer 13 is reduced, so that the wear can be suppressed. Therefore, it is possible to use the thrust roller bearing even under environments where the radial load such as eccentricity or centrifugal force is applied to the thrust roller bearing 100 of the related art and the thin thrust roller bearing 100 is thus difficult to be used. Also, from the standpoint of securing a space, the thrust roller bearing 10A of the second embodiment can be used even at a part at which a slide bearing such as a washer has been used, so that it is possible to reduce a rotation resistance.

As described above, according to the thrust roller bearing 10A of the second embodiment, the first race 11 has the hook curl part 11e formed by bending the first race part from the inner-diameter-side periphery of the first race part 11a toward the outer-diameter-side obliquely in the radial direction, and the inner peripheral surface 13d of the retainer 13 has the conical surface 13d1 formed to be substantially parallel to the outer peripheral surface 11f of the hook curl part 11e. The outer peripheral surface 11f of the hook curl part 11e is configured to hold the retainer 13 without separating therefrom by contacting the inner peripheral surface 13d of the retainer 13 in a sliding manner. Therefore, the hook curl part 11e has both a function of holding the retainer 13 and a function of guiding the retainer when the radial load or radial displacement is applied to the thrust roller bearing 10A. Also, even when the thrust roller bearing 10A is made thin, it is possible to secure an area of the sliding contact part between the outer peripheral surface 11f of the hook curl part 11e and the inner peripheral surface 13d of the retainer 13, so that it is possible to reduce the surface pressure of the sliding contact part and to thus suppress the wear. Thereby, it is possible to manufacture the non-separable and thin thrust roller bearing 10A to be guided at the inner periphery-side of the retainer 13.

Third Embodiment

Subsequently, a method of manufacturing a thrust bearing in accordance with a third embodiment of the present invention is described with reference to FIG. 5. In the meantime, the same or equivalent elements as or to the thrust bearing of the first embodiment are denoted with the same reference numerals, and the descriptions thereof are omitted or simplified.

In the first embodiment, the outer-diameter-side part of the retainer 13 is pushed with elastically deformed into the first race 11 having the bent hook curl part 11b, so that the retainer 13 is incorporated into the hook curl part 11b of the first race 11. In the third embodiment, the retainer 13 is incorporated into the hook curl part 11b of the hook curl part 11b of the first race 11 by bending the hook curl part 11b with the retainer 13 being set to a race material for forming the first race 11.

Figure 5:
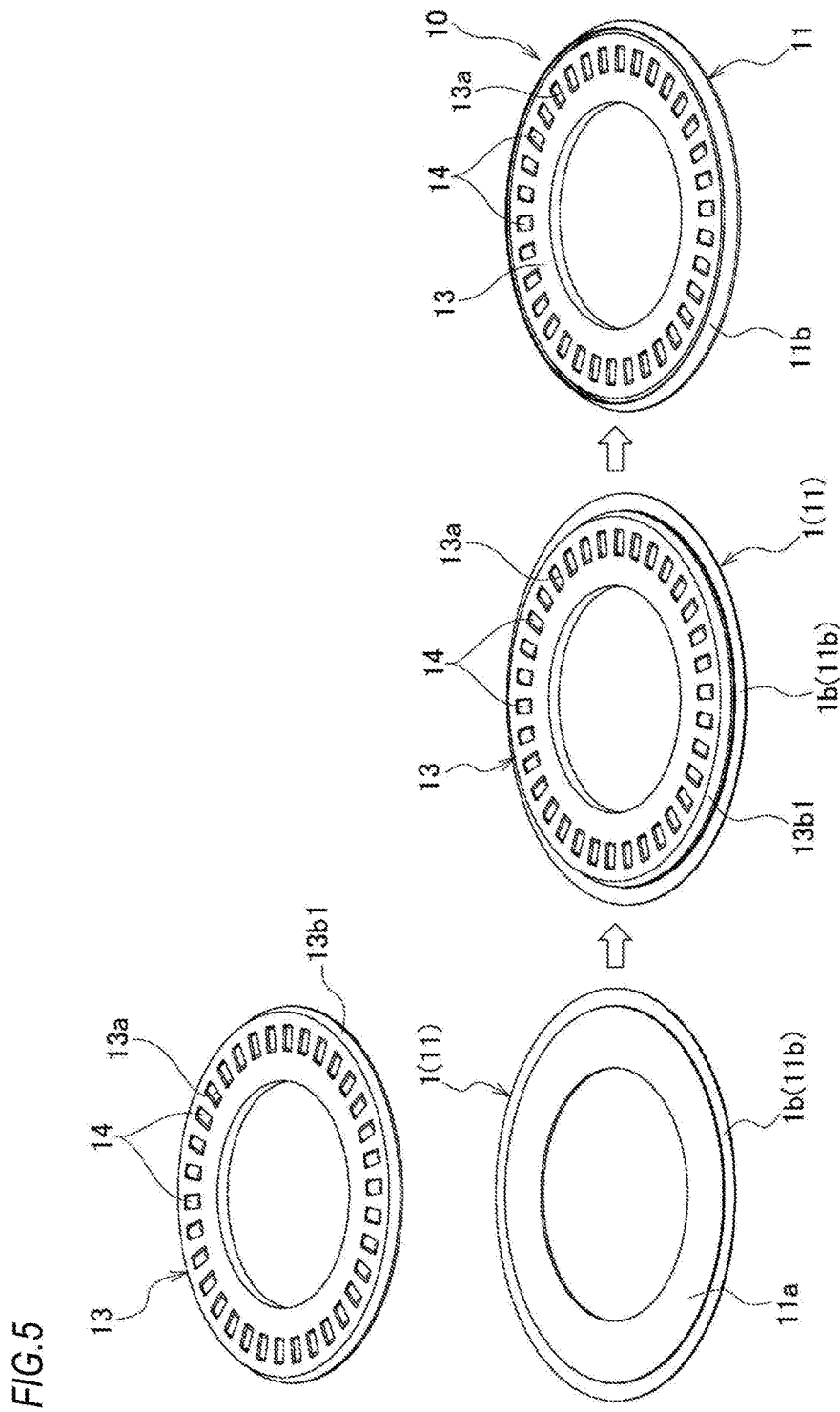
FIG. 5 illustrates an assembling method of a thrust roller bearing in accordance with a third embodiment of the present invention.

That is, as shown in FIG. 5, according to the manufacturing method of the third embodiment, the retainer 13 having the plurality of rollers 14 arranged in the plurality of pockets 13a of the retainer 13 and an annular-shaped race material 1 are prepared. The race material 1 has the circular ring-shaped first race part 11a and an outer-diameter-side part 1b for forming the hook curl part 11b provided at a radially outermore side than the first race part 11a. In the meantime, the first race part 11a and the outer-diameter-side part 1b may have a continuous flat shape or may have a stepped shape between the first race part 11a and the outer-diameter-side part 1b by thinning a plate thickness of the outer-diameter-side part 1b relative to the first race part 11a.

Then, the retainer 13 is placed on the race material 1, and the retainer 13 and the race material 1 are arranged so that the plurality of rollers 14 contacts the first race part 11a of the race material 1.

Thereafter, the outer-diameter-side part 1b of the race material 1 is bent toward the inner-diameter-side obliquely in the radial direction so as to be substantially parallel to the conical surface 13b1 of the retainer 13, so that the first race 11 having the book curl part 11b is formed. Thereby, the assembling of the retainer 13 configured to hold the plurality of rollers 14 and the first race 11 is completed.

The thrust bearing 10 is assembled as described above, so that it is possible to improve a mounting ability of the retainer 13 to the first race 11, to increase an overlapping length L (refer to FIG. 1) in the radial direction between the hook curl part 11b of the first race 11 and the conical surface 13b1 of the retainer 13 and to prevent the retainer 13 from separating from the first race 11.

Figure 6:
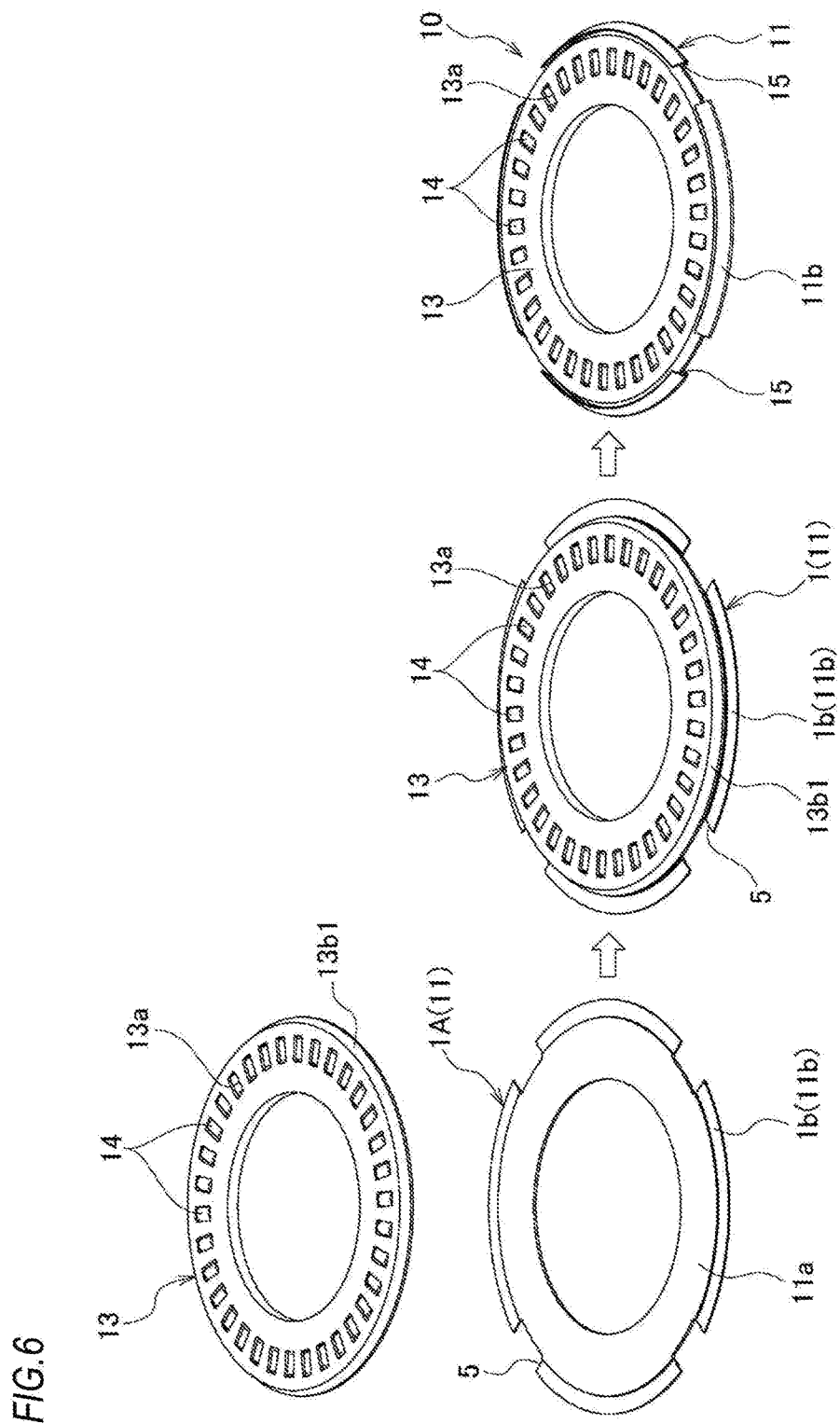
FIG. 6 illustrates an assembling method of a thrust roller bearing in accordance with a modified embodiment of the third embodiment of the present invention.

Meanwhile, in a method of manufacturing the thrust bearing in accordance with a modified embodiment of the third embodiment, as shown in FIG. 6, a race material 1A where the outer-diameter-side part 1b is divided into four parts by four groove portions 5 configuring the notched portions 15 is used.

For this reason, like the third embodiment, the retainer 13 is incorporated to the inner sides of the hook curl parts 11b of the first race 11 by bending the plurality of hook curl parts 11b with the retainer being set to the race material 1A. At this time, the race material 1A is provided with the groove portions 5, so that it is possible to suppress sagging of the material, which may be caused when bending the hook curl parts 11b.

In the meantime, the number of the notched portions 15 may be arbitrarily set inasmuch as it is possible to suppress the sagging of the material. For example, at least one notched portion may be provided.

In the third embodiment, the manufacturing method of the thrust bearing has been described using the thrust bearing 10 of the first embodiment. However, the manufacturing method of third embodiment can also be applied to the thrust bearing 10A of the second embodiment.

That is, in a case where the retainer 13 is guided at the inner-diameter-side of the first race 11, the hook curl part 11b can be formed by bending the inner-diameter-side part of the race material toward the outer-diameter-side obliquely in the radial direction with the retainer 13 being set to the annular-shaped race material.

Also in this case, like the modified embodiment of the third embodiment, the circumferential surface of the first race at which the hook curl parts are to be formed may be provided with at least one notched portion by forming the groove portion at least at one place of the race material.

Also, the manufacturing method of the third embodiment can be applied to a configuration where the first race 11 has the hook curl parts 11b, 11e at both sides of the inner-diameter-side part and the outer-diameter-side part and the retainer 13 is to be guided at both radial sides of the first race 11.

Fourth Embodiment

Subsequently, a thrust bearing in accordance with a fourth embodiment of the present invention is described with reference to FIG. 7. In the meantime, the same or equivalent elements as or to the thrust bearing of the first embodiment are denoted with the same reference numerals, and the descriptions thereof are omitted or simplified.

Figure 7:
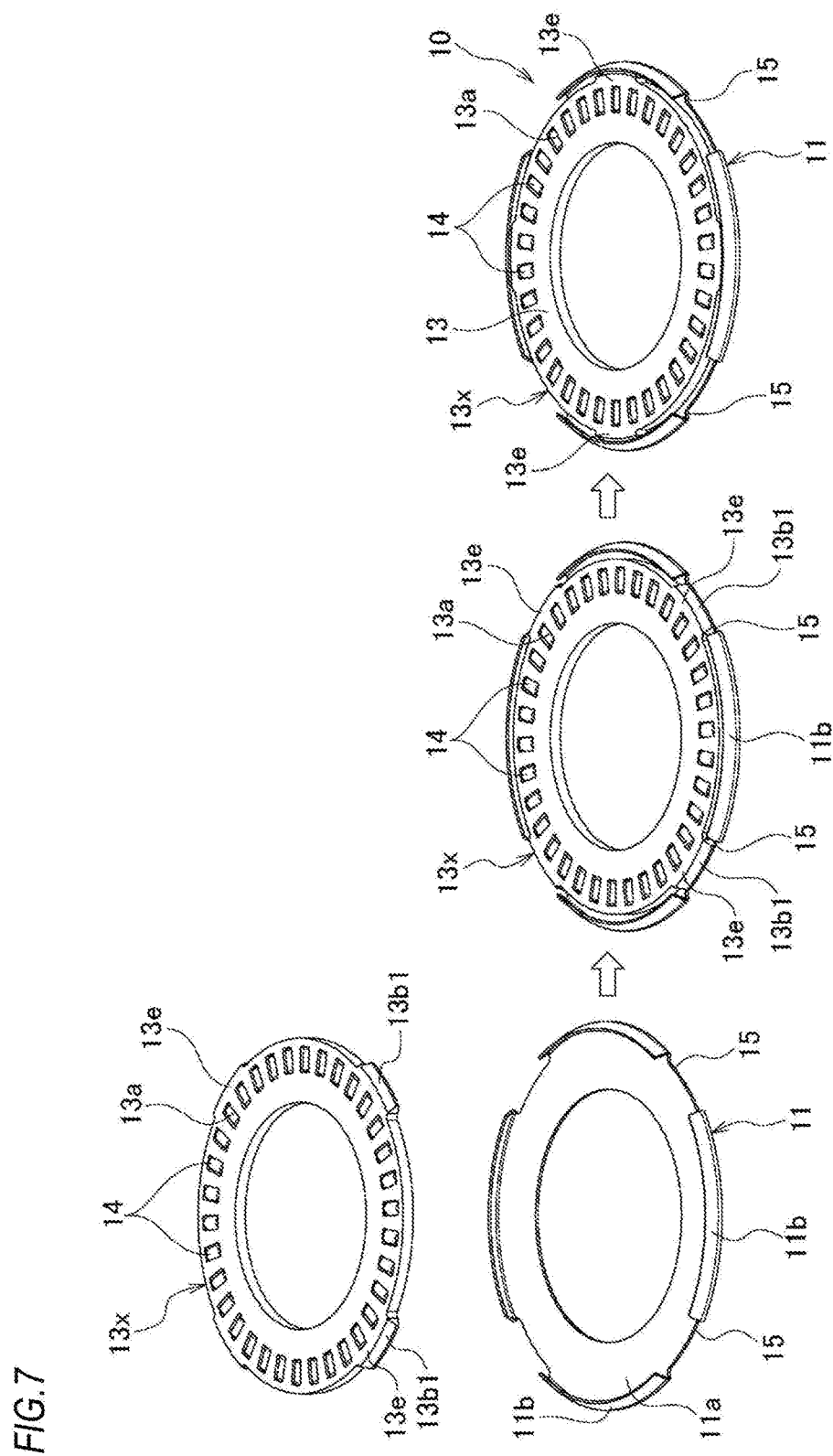
FIG. 7 illustrates an assembling method of a thrust roller bearing in accordance with a fourth embodiment of the present invention.

As shown in FIG. 7, the first race 11 of the fourth embodiment has a plurality of (four, in the fourth embodiment) hook curl parts 11b, which are formed by bending the first race part from the outer-diameter-side periphery of the first race part 11a toward the inner-diameter-side obliquely in the radial direction and are provided by a plurality of (four, in the fourth embodiment) notched portions 15. The plurality of notched portions 15 is formed with predetermined intervals in the circumferential direction.

Also, a retainer 13x has a plurality of protrusions 13e protruding radially outward and provided at four places with predetermined intervals in the circumferential direction. Outer peripheral surfaces of the plurality of protrusions 13e are formed with conical surfaces 13b1 formed to be substantially parallel to the inner peripheral surfaces of the plurality of hook curl parts 11b. Therefore, the inner peripheral surfaces of the plurality of hook curl parts 11b are configured to hold the retainer 13 without separating therefrom by contacting the conical surfaces 13b1 of the protrusions 13e, which are the outer peripheral surface of the retainer, in a sliding manner.

In the meantime, the plurality of protrusions 13e and the plurality of notched portions 15 of the first race 11 are formed so that circumferential phases thereof correspond to each other. Also, a circumferential length of the notched portion 15 is formed equal to or greater than a circumferential length of the protrusion 13e.

In a manufacturing method of the thrust bearing 10 configured as described above, the retainer 13x having the plurality of rollers 14 arranged in the plurality of pockets 13a and the first race 11 having the plurality of hook curl parts 11b are prepared.

Then, the retainer 13x is incorporated into the first race 11 with the phases of the plurality of protrusions 13e and the plurality of notched portions 15 being matched, and the retainer 13x and the first race 11 are arranged so that the plurality of rollers 14 contacts the first race part 11a of the first race 11.

Thereafter, the retainer 13x is rotated relative to the first race 11 so that the conical surfaces 13b1 of the retainer 13x face radially the plurality of hook curl parts 11b of the first race 11. Thereby, the mounting of the retainer 13x to the first race 11 is completed.

The thrust bearing 10 is assembled as described above, so that it is possible to improve the mounting ability of the retainer 13x to the first race 11, to increase the overlapping length L (refer to FIG. 1) in the radial direction between the hook curl part 11b of the first race 11 and the conical surface 13b1 of the retainer 13x and to prevent the retainer 13x from separating from the first race 11. Also, the first race 11, the retainer 13x and the plurality of rollers 14 are integrated, so that the handling property is improved.

Meanwhile, in the fourth embodiment, the plurality of notched portions 15 of the first race 11 and the plurality of protrusions 13e of the retainer 13x are respectively formed with the predetermined intervals in the circumferential direction and are also formed to have the same circumferential length, respectively.

Figure 8A:
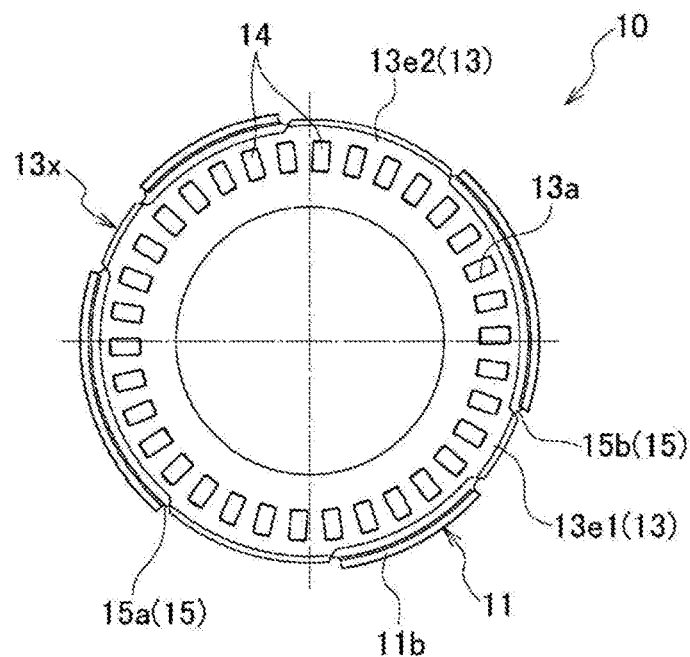
FIG. 8A is a top view of a thrust roller bearing in accordance with a modified embodiment of the fourth embodiment.

However, as shown in a modified embodiment of FIG. 8A, the plurality of notched portions 15 of the first race 11 and the plurality of protrusions 13e of the retainer 13x may be formed to have different circumferential lengths. That is, the plurality of notched portions 15a, 15b having different circumferential lengths and the plurality of protrusions 13e1, 13e2 having different circumferential lengths are alternately formed in the circumferential direction.

Figure 8B:
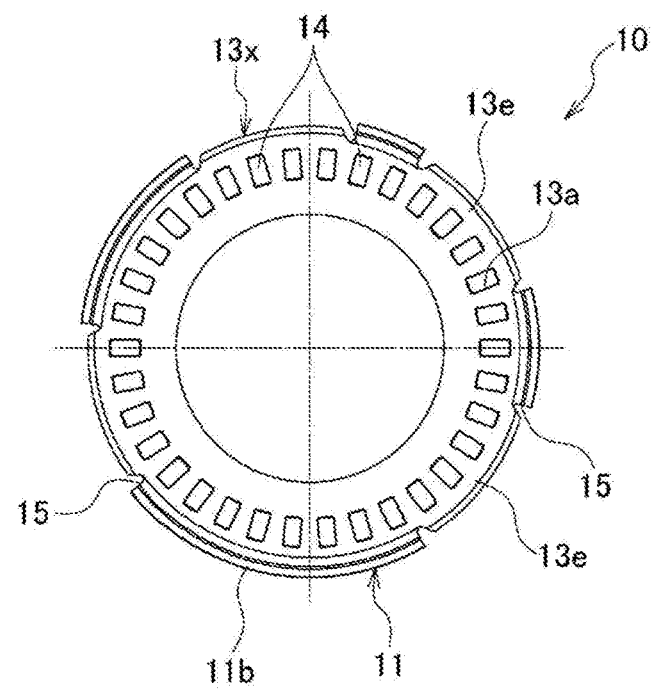
FIG. 8B is a top view of a thrust roller bearing in accordance with another modified embodiment of the fourth embodiment.

Alternatively, as shown in another modified embodiment of FIG. 8B, the circumferential phases of the plurality of notched portions 15 of the first race 11 and the plurality of protrusions 13e of the retainer 13x may be unequal.

Figure 9:
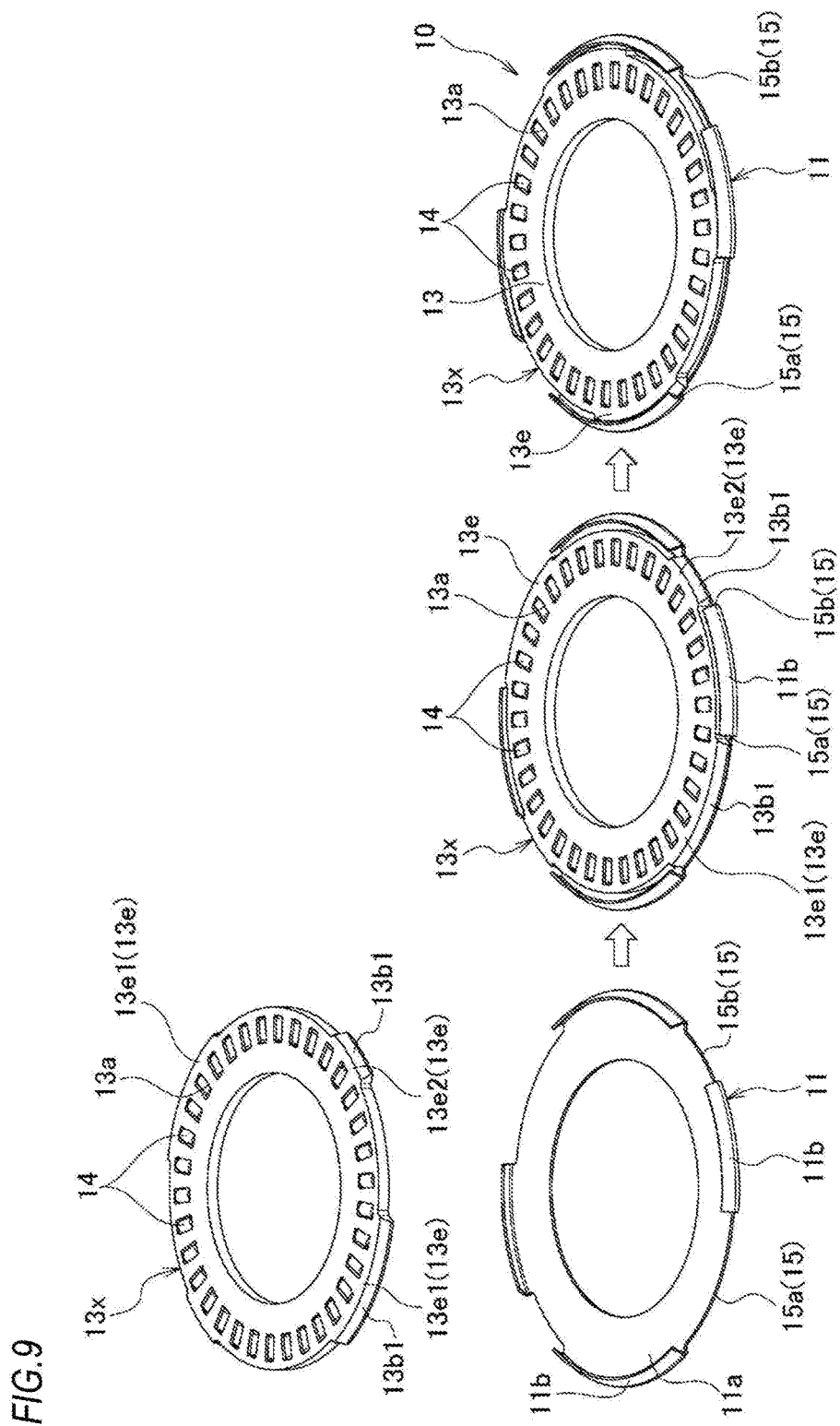
FIG. 9 illustrates an assembling method of a thrust roller bearing in accordance with a modified embodiment of the fourth embodiment.
Figure 10:
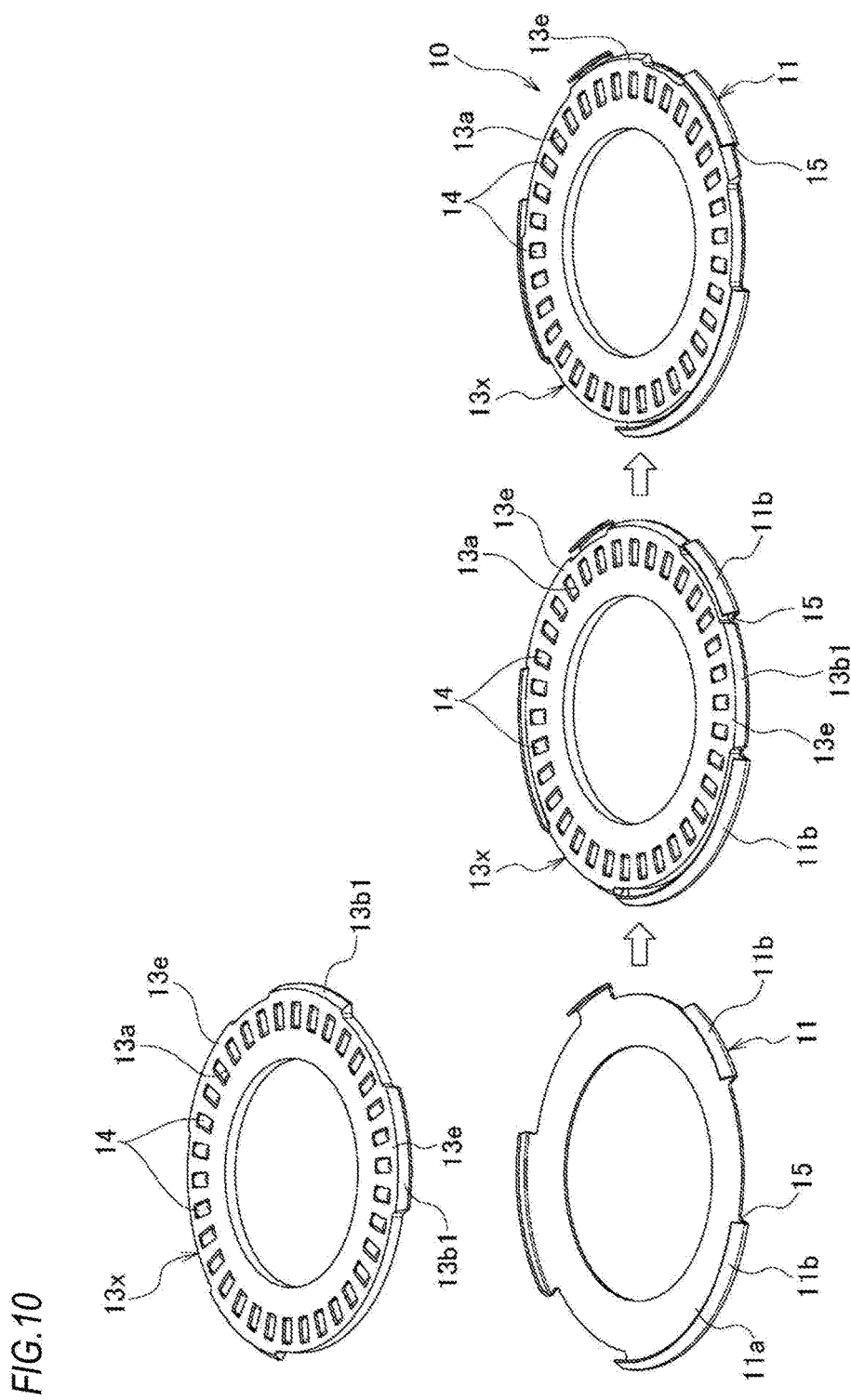
FIG. 10 illustrates an assembling method of a thrust roller bearing in accordance with another modified embodiment of the fourth embodiment.

In the meantime, as shown in FIGS. 9 and 10, a manufacturing method of the thrust bearing of the modified embodiment of FIG. 8A and a manufacturing method of the thrust bearing of another modified embodiment of FIG. 8B are the same as the above embodiment.

Also, in the fourth embodiment, the manufacturing method of the thrust bearing 10 where the retainer 13x is to be guided at the outer-diameter-side of the first race 11 has been described. However, the manufacturing method can also be applied to a thrust bearing where the retainer is to be guided at the inner-diameter-side of the first race 11.

That is, the first race is provided with the plurality of hook curl parts, which are formed by bending the first race part from the inner-diameter-side periphery of the first race part toward the outer-diameter-side obliquely in the radial direction, by the plurality of notched portions, respectively. Also, the inner peripheral surface of the retainer has the plurality of protrusions protruding radially inward of which conical surfaces are formed to be substantially parallel to the outer peripheral surfaces of the plurality of hook curl parts. The outer peripheral surfaces of the plurality of hook curl parts are configured to hold the retainer without separating therefrom by contacting the inner peripheral surface of the retainer.

Also in this case, the retainer and the race are arranged with the phases of the plurality of protrusions of the retainer and the plurality of notched portions of the race being matched, and the retainer is rotated relative to the race so that the conical surfaces of the retainer face radially the plurality of hook curl parts of the race. As a result, it is possible to integrally mount the first race, the retainer, and the plurality of rollers.

Also, the manufacturing method of the fourth embodiment can be applied to a configuration where the first race 11 has the hook curl parts at both sides of the inner-diameter-side part and the outer-diameter-side part and the retainer is to be guided at both radial sides of the first race 11.

In the meantime, the present invention is not limited to the respective embodiments and can be appropriately modified and improved.

Figure 11:
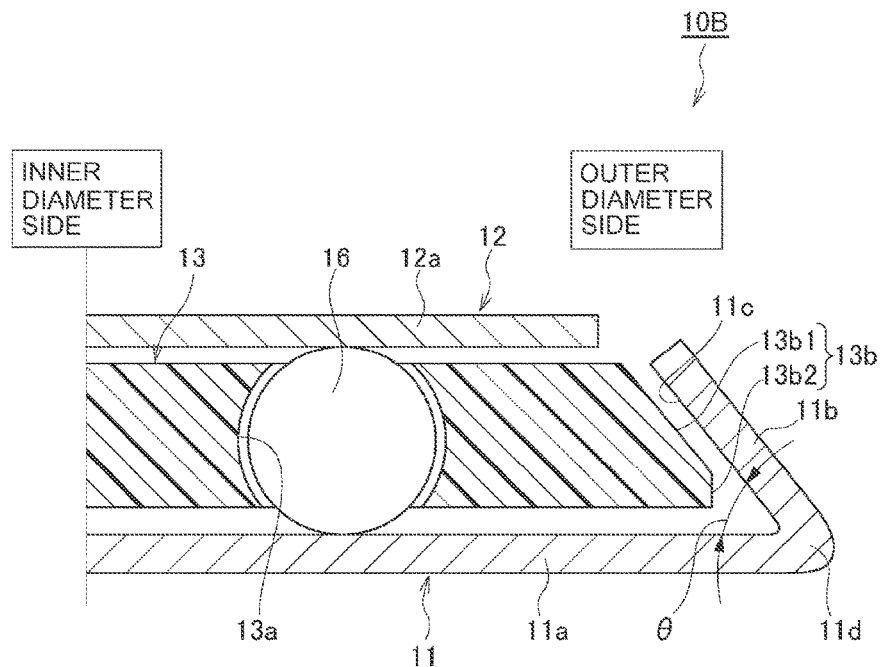
FIG. 11 is a sectional view of a thrust ball bearing in accordance with a modified embodiment of the present invention.
Figure 12:
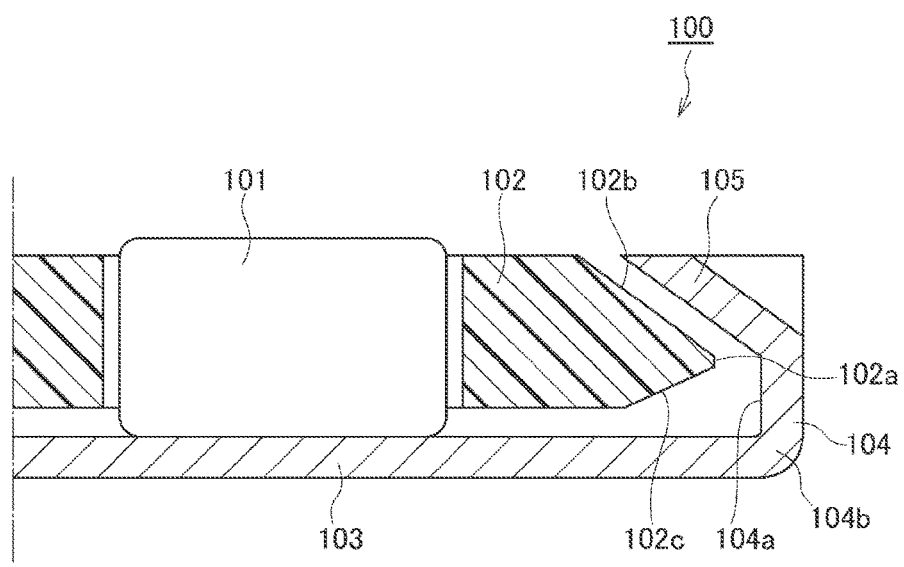
FIG. 12 is a sectional view of a thrust roller bearing of the related art.

In the respective embodiments, the thrust roller bearing having the rollers 14 as the rolling elements has been described. However, as shown in FIG. 11, the thrust bearing of the present invention may be a thrust ball bearing 10B having balls 16 as the rolling elements. Also, in FIG. 11, the retainer 13 is guided at the outer-diameter-side of the first race 11, like the first embodiment. However, like the second embodiment, the retainer 13 may be configured to be guided at the inner-diameter-side of the first race 11.

The subject application is based on a Japanese Patent Application No. 2014-153074 filed on Jul. 28, 2014 and a Japanese Patent Application No. 2015-145144 filed on Jul. 22, 2015, which are herein incorporated by reference.

DESCRIPTION OF REFERENCE NUMERALS

1: race material
10, 10A: thrust roller bearing (thrust bearing)
10B: thrust hall bearing (thrust hearing)
11: first race
11a: first race part
11b, 11e: hook curl part
11c: inner peripheral surface of hook curl part
11f: outer peripheral surface of hook curl part
12: second race
12a: second race part
13, 13x: retainer
13a: pocket
13b: outer peripheral surface of retainer
13b1: conical surface
13d: inner peripheral surface of retainer
13e: protrusion
14: roller (rolling element)
15: notched portion
16: ball (rolling element)

The invention claimed is:

1. A thrust bearing comprising:
a retainer having a plurality of pockets arranged radially,
a plurality of rolling elements arranged so as to freely rotate inside the plurality of pockets, and
at least one race having an annular-shaped race part in which the plurality of rolling elements moves,
wherein the race has a hook curl part formed by bending the race part from an outer-diameter-side periphery of the race part toward an inner-diameter-side obliquely in a radial direction,
wherein an outer peripheral surface of the retainer has a conical surface formed to be substantially parallel to an inner peripheral surface of the hook curl part, the conical surface including a small-diameter-side part at one end and a large-diameter-side part at an opposite end,
wherein the inner peripheral surface of the hook curl part is configured to hold the retainer without separating therefrom by contacting the outer peripheral surface of the retainer in a sliding manner,
wherein the outer peripheral surface of the retainer further includes a cylindrical surface disposed adjacent to the large-diameter-side part of the conical surface to prevent interference with the outer-diameter-side periphery of the race part, and
wherein when a radial displacement is applied, the conical surface of the retainer and the inner peripheral surface of the hook curl part contact first in a sliding manner.

2. The thrust bearing according to claim 1,
wherein the thrust bearing is a thrust roller bearing of which rolling elements are rollers.

3. The thrust bearing according to claim 1,
wherein the thrust bearing is a thrust ball bearing of which rolling elements are balls.

4. A method of manufacturing the thrust bearing according to claim 1,
the method comprising:
a process of preparing the retainer having the plurality of rolling elements arranged in the plurality of pockets and an annular-shaped race material,
a process of arranging the retainer and the race material so that the plurality of rolling elements is in contact with a race part of the race material, and
a process of forming the hook curl part by bending an outer-diameter-side part of the race material toward an inner-diameter-side obliquely in a radial direction so as to be substantially parallel to the conical surface of the retainer.

5. The thrust bearing according to claim 1,
wherein the race has a plurality of hook curl parts, which are formed by bending from an outer-diameter-side periphery toward an inner-diameter-side obliquely in a radial direction and are provided by a plurality of notched portions.

6. A method of manufacturing the thrust bearing according to claim 5, the method comprising:
a process of preparing the retainer having the plurality of rolling elements arranged in the plurality of pockets and an annular-shaped race material provided with a plurality of groove portions,
a process of arranging the retainer and the race material so that the plurality of rolling elements is in contact with a race part of the race material, and
a process of forming the plurality of the hook curl parts by bending an outer-diameter-side part of the race material toward an inner-diameter-side obliquely in a radial direction so as to be substantially parallel to the conical surface of the retainer.

7. The thrust bearing according to claim 5,
wherein the retainer has a plurality of protrusions corresponding to the plurality of hook curl parts.

8. A method of manufacturing the thrust bearing according to claim 7,
the method comprising:
a process of preparing the retainer having the plurality of rolling elements arranged in the plurality of pockets and the race having the plurality of hook curl parts and the plurality of notched portions formed thereto,
a process of incorporating the retainer to the race with phases of the plurality of protrusions and the plurality of notched portions being matched and arranging the retainer and the race so that the plurality of rolling elements is in contact with the race part of the race, and
a process of rotating the retainer relative to the race so that the conical surfaces of the retainer face the plurality of hook curl parts of the race in a radial direction.

9. A thrust bearing comprising:
a retainer having a plurality of pockets arranged radially,
a plurality of rolling elements arranged so as to freely rotate inside the plurality of pockets, and
at least one race having an annular-shaped race part in which the plurality of rolling elements moves,
wherein the race has a hook curl part formed by bending the race part from an inner-diameter-side periphery of the race part toward an outer-diameter-side obliquely in a radial direction,
wherein an inner peripheral surface of the retainer has a conical surface formed to be substantially parallel to an outer peripheral surface of the hook curl part, the conical surface including a small-diameter-side part at one end and a large-diameter-side part at an opposite end,
wherein the outer peripheral surface of the hook curl part is configured to hold the retainer without separating therefrom by contacting the inner peripheral surface of the retainer in a sliding manner, and wherein the inner peripheral surface of the retainer has a cylindrical surface adjacent to the small-diameter-side part of the conical surface to prevent interference with the inner-diameter-side periphery of the race part.

10. The thrust bearing according to claim 9, wherein the thrust bearing is a thrust roller bearing of which rolling elements are rollers.

11. The thrust bearing according to claim 9, wherein the thrust bearing is a thrust ball bearing of which rolling elements are balls.

12. A method of manufacturing the thrust bearing according to claim 9 the method comprising:

a process of preparing the retainer having the plurality of rolling elements arranged in the plurality of pockets and an annular-shaped race material, a process of arranging the retainer and the race material so that the plurality of rolling elements is in contact with a race part of the race material, and a process of forming the hook curl part by bending an inner-diameter-side part of the race material toward an outer-diameter-side obliquely in a radial direction so as to be substantially parallel to the conical surface of the retainer.

13. The thrust bearing according to claim 9, wherein the race has a plurality of hook curl parts, which are formed by bending from an inner-diameter-side periphery toward an outer-diameter-side obliquely in a radial direction and are provided by a plurality of notched portions.

14. A method of manufacturing the thrust bearing according to claim 13, the method comprising:

a process of preparing the retainer having the plurality of rolling elements arranged in the plurality of pockets and an annular-shaped race material provided with a plurality of groove portions, a process of arranging the retainer and the race material so that the plurality of rolling elements is in contact with a race part of the race material, and a process of forming the plurality of the hook curl parts by bending an inner-diameter-side part of the race material toward an outer-diameter-side obliquely in a radial direction so as to be substantially parallel to the conical surface of the retainer.

15. The thrust bearing according to claim 13, wherein the retainer has a plurality of protrusions corresponding to the plurality of hook curl parts.

16. A method of manufacturing the thrust bearing according to claim 15, the method comprising:

a process of preparing the retainer having the plurality of rolling elements arranged in the plurality of pockets and the race having the plurality of hook curl parts and the plurality of notched portions formed thereto, a process of incorporating the retainer to the race with phases of the plurality of protrusions and the plurality of notched portions being matched and arranging the retainer and the race so that the plurality of rolling elements is in contact with the race part of the race, and a process of rotating the retainer relative to the race so that the conical surfaces of the retainer face the plurality of hook curl parts of the race in a radial direction.

\* \* \* \* \*